United States Patent
Nehse et al.

(10) Patent No.: US 12,547,504 B2
(45) Date of Patent: Feb. 10, 2026

(54) METHOD FOR EFFICIENT SPARE PE ALLOCATION OF A RAID SYSTEM

(71) Applicant: DELL PRODUCTS L.P., Round Rock, TX (US)

(72) Inventors: Paul Nehse, Livermore, CA (US); Michael Thiels, San Martin, CA (US); Dale Stephenson, Buford, GA (US); Devendra Kulkarni, Santa Clara, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 98 days.

(21) Appl. No.: 18/422,580

(22) Filed: Jan. 25, 2024

(65) Prior Publication Data
US 2025/0245106 A1 Jul. 31, 2025

(51) Int. Cl.
*G06F 11/14* (2006.01)
(52) U.S. Cl.
CPC ................. *G06F 11/1469* (2013.01)
(58) Field of Classification Search
CPC .............. G06F 11/14; G06F 11/1469
See application file for complete search history.

(56) References Cited

U.S. PATENT DOCUMENTS

| | | | |
|---|---|---|---|
| 2022/0229568 A1* | 7/2022 | Danilov | G06F 11/1004 |
| 2022/0357867 A1* | 11/2022 | Nehse | G06F 3/0647 |
| 2022/0357880 A1* | 11/2022 | Nehse | G06F 3/0689 |
| 2022/0357881 A1* | 11/2022 | Nehse | G06F 3/0617 |

\* cited by examiner

*Primary Examiner* — Kamini B Patel
(74) *Attorney, Agent, or Firm* — WOMBLE BOND DICKINSON (US) LLP

(57) ABSTRACT

A physical extent manager (PEM) receives a first message indicating a first PE of a first redundant array of independent disks (RAID) array of a disk has failed. The PEM determines a plurality of spare physical extents (PEs) available for reconstruction, the plurality of spare PEs including a first spare PE and a second spare PE. The PEM determines that the first spare PE has previously been assigned to a second PE of a second RAID array for reconstruction. The PEM determines that the first PE is able to use the first spare PE for reconstruction as the first spare PE meets the array row rule for the first PE and that the second PE is able to use the second spare PE for reconstruction as the second spare PE meets the array row rule for the second PE.

20 Claims, 11 Drawing Sheets

METHOD FOR EFFICIENT SPARE PE ALLOCATION OF A RAID SYSTEM

FIELD OF THE INVENTION

Embodiments of the present invention relate generally to data storage systems. More particularly, embodiments of the invention relate to a method for efficient spare physical extent (PE) allocation of a raid system.

BACKGROUND

Customers are increasingly adopting different technologies for data storage. Both appliances and software only packages that can be deployed in a hypervisor environment are desired. The scale up architecture needs to be extensible to be deployed in both physical and virtual environments.

Traditional data storage systems use a scale up architecture which may require very large and complex disk farms to meet customer capacity and performance requirements. A protection pool architecture, for example, allows linear scaling of performance and capacity by adding storage nodes. This allows tenants of a multi-tenant storage node to start with smaller capacity nodes and incrementally scale the storage capacity as requirements change.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
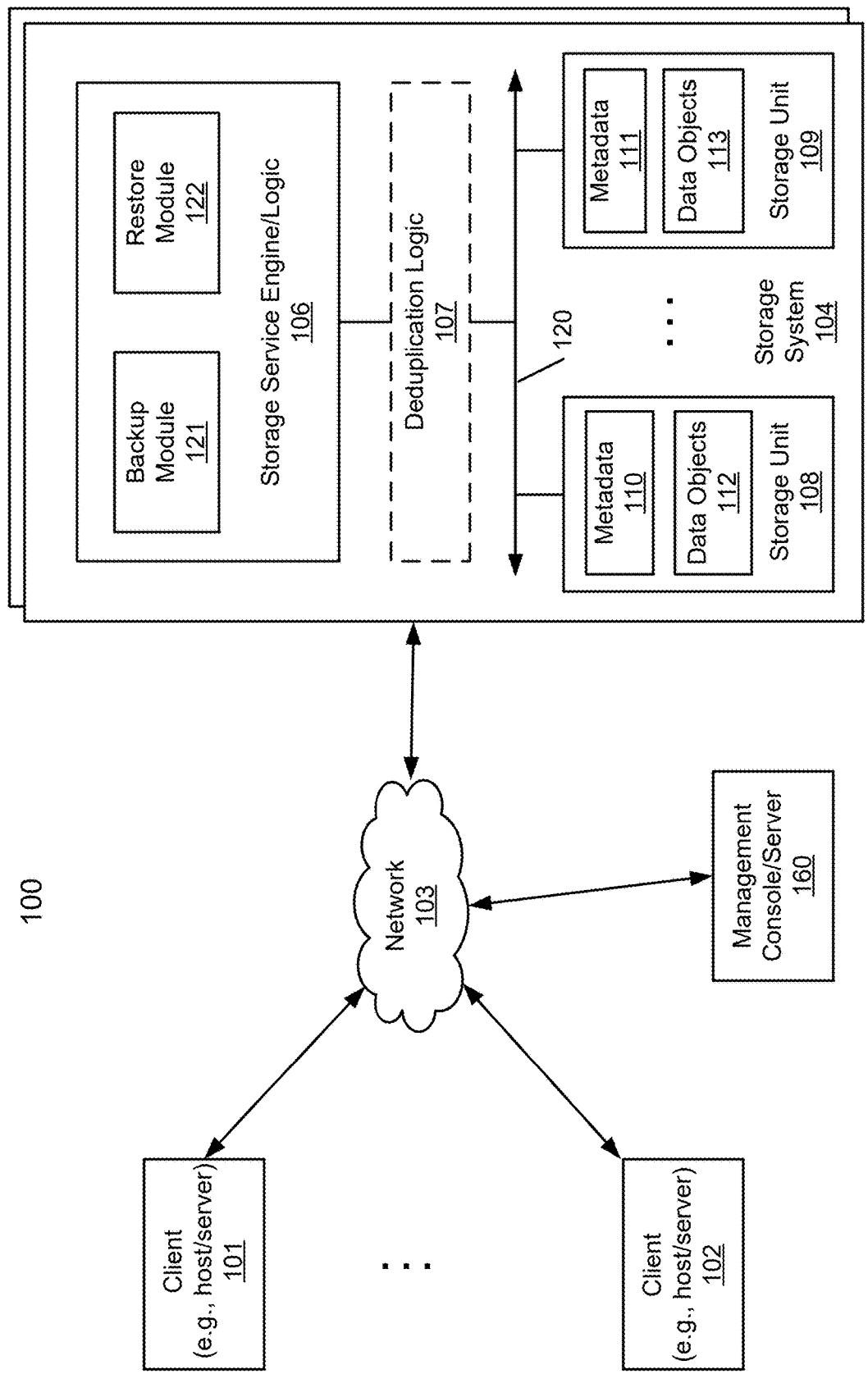
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A redundant array of independent disks (RAID) array is a data storage virtualization technique that combines a number of physical disk together into one or more logical units for the purpose of data redundancy (e.g., mirroring), performance improvements (e.g., striping), or both. In a RAID array, data is distributed across the physical disks, in one of several ways (e.g., mirroring, striping, etc.), referred to as RAID levels. Different RAID levels provide a different redundancy scheme to balance reliability, availability, performance, and capacity of the RAID array. Reference in the specification to "an array" means a RAID array.

Currently Data Domain (DD) uses a scale up model which requires large and complex disk farms to meet our customer capacity and performance requirements. Using a Protection Pool strategy allows customers to expand cluster capacity and performance by adding additional nodes. This allows customers to buy smaller capacity nodes and scale the cluster incrementally as requirements change.

Limitations of the traditional approach are: when a disk fails on the current Data Domain Protection Pool, Physical Extent Manager (PEM) allocates the next available spare extent for every failed extent on a failed disk from the available spare extents pool. Every spare extent on spinning hard disks that gets allocated needs to follow an "Array row rule" where a RAID array row cannot have more than one extent from same disk due to hardware limitations of the hard disk. Depending on how many disks have failed, the management of spare PE allocation can be more complicated.

Embodiments of the present disclosure relates to a method/system that efficiently allocate spare PEs so that available spare PE utilization will be maximized. Advantages of the embodiments include: an enhanced spare allocation scheme, so degraded RAID arrays can be served faster which reduces the time an array has to run in degraded mode.

According to one aspect, a physical extent manager (PEM) receives a first message indicating a first PE of a first redundant array of independent disks (RAID) array of a disk has failed, wherein the first message including a plurality of allocated physical extents (PEs) and a plurality of RAID arrays corresponding to the allocated PEs.

The PEM determines a plurality of spare physical extents (PEs) available for reconstruction, the plurality of spare PEs including a first spare PE and a second spare PE.

The PEM determines that the first spare PE has previously been assigned to a second PE of a second RAID array for reconstruction.

The PEM determines that the first PE is able to use the first spare PE for reconstruction as the first spare PE meets the array row rule for the first PE and that the second PE is able to use the second spare PE for reconstruction as the second spare PE meets the array row rule for the second PE based on the first message, wherein the array row rule includes that an extent row cannot have two PEs on a same physical disk.

The PEM reassigns the first PE to the first spare PE and the second PE to the second spare PE for reconstruction, and the first and the second spare PEs are allocated for the reconstruction of the first PE and the second PE according to the reassignment.

In one embodiment, before the PEM receives the first message, a local disk manager (LDM) performs a periodic disk check to proactively fail the disk, wherein when the disk exceeds an error threshold for a predetermined period of time, the disk is marked as a failing disk.

In one embodiment, the LDM is configured to manage one or more local PEs at the one or more storage disks.

In one embodiment, the current free PE is available in a spare PE pool.

In one embodiment, the allocating the spare PEs for the reconstruction of PE1 and PE2 comprises allocating one or more spare PEs including the first PE and the second PE to each of affected array via an array group (AGRP).

In one embodiment, the AGRP comprises a plurality of storage arrays representing a plurality of raid arrays each having a raid configuration, wherein each of the plurality of storage arrays comprises one or more virtual disks, wherein each of the one or more virtual disks is associated to at least one PE, wherein the at least one PE includes one of: a local PE or an external PE, wherein the external PE is external to the storage node.

In one embodiment, when the disk fails, the LDM prepares a list of PEs for the AGRP, the list indicating the PEs that are allocated on the failed disk.

In one embodiment, the LDM notifies AGRP with a list of PEs for all affected arrays.

In one embodiment, the AGRP instructs each array to fail the affected PEs.

In one embodiment, the LDM sends the first message to the PEM indicating the disk that failed and the list of all the allocated PEs and which arrays allocated to.

According to a second aspect, a PEM device includes a processors and a memory coupled to the processor to store instructions, which when executed by the processor, cause the processor to perform operations, the operations comprising that a physical extent manager (PEM) receives a first message indicating a first PE of a first redundant array of independent disks (RAID) array of a disk has failed, wherein the first message including a plurality of allocated physical extents (PEs) and a plurality of arrays corresponding to the allocated PEs.

In one embodiment, the PEM determines a plurality of spare physical extents (PEs) available for reconstruction, the plurality of spare PEs including a first spare PE and a second spare PE.

In one embodiment, the PEM determines that the first spare PE has previously been assigned to a second PE of a second RAID array for reconstruction;

In one embodiment, the PEM determines that the first PE is able to use the first spare PE for reconstruction as the first spare PE meets the array row rule for the first PE and that the second PE is able to use the second spare PE for reconstruction as the second spare PE meets the array row rule for the second PE based on the first message, wherein the array row rule includes that an extent row cannot have two PEs on a same physical disk.

In one embodiment, the PEM reassigns the first PE to the first spare PE and the second PE to the second spare PE for reconstruction, and the first and the second spare PEs are allocated for the reconstruction of the first PE and the second PE according to the reassignment.

In one embodiment, before the PEM receives the first message, a local disk manager (LDM) performs a periodic disk check to proactively fail the disk, wherein when the disk exceeds an error threshold for a predetermined period of time, the disk is marked as a failing disk.

In one embodiment, the LDM is configured to manage one or more local PEs at the one or more storage disks.

In one embodiment, the current free PE is available in a spare PE pool.

In one embodiment, the allocating the spare PEs for the reconstruction of the first PE and the second PE comprises allocating one or more spare PEs including the first PE and the second PE to each of affected array via an array group (AGRP).

In one embodiment, the AGRP comprises a plurality of storage arrays representing a plurality of raid arrays each having a raid configuration, wherein each of the plurality of storage arrays comprises one or more virtual disks, wherein each of the one or more virtual disks is associated to at least one PE, wherein the at least one PE includes one of: a local PE or an external PE, wherein the external PE is external to the storage node.

In one embodiment, when the disk fails, the LDM prepares a list of PEs for the AGRP, the list indicating the PEs that are allocated on the failed disk.

In one embodiment, the LDM notifies AGRP with a list of PEs for all affected arrays.

In one embodiment, the AGRP instructs each array to fail the affected PEs.

In one embodiment, the LDM sends the first message to the PEM indicating the disk that failed and the list of all the allocated PEs and which arrays allocated to.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In some embodiments, storage system 104 can be virtual and/or purpose-built backup appliances (PBBA). A PBBA is a standalone disk-based storage device that is configured and optimized for storing backup data. A virtual backup appliance is a preconfigured storage solution for storing cloud-based backup data. The backup data can be files in a file system of storage system 104.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly, there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 2:
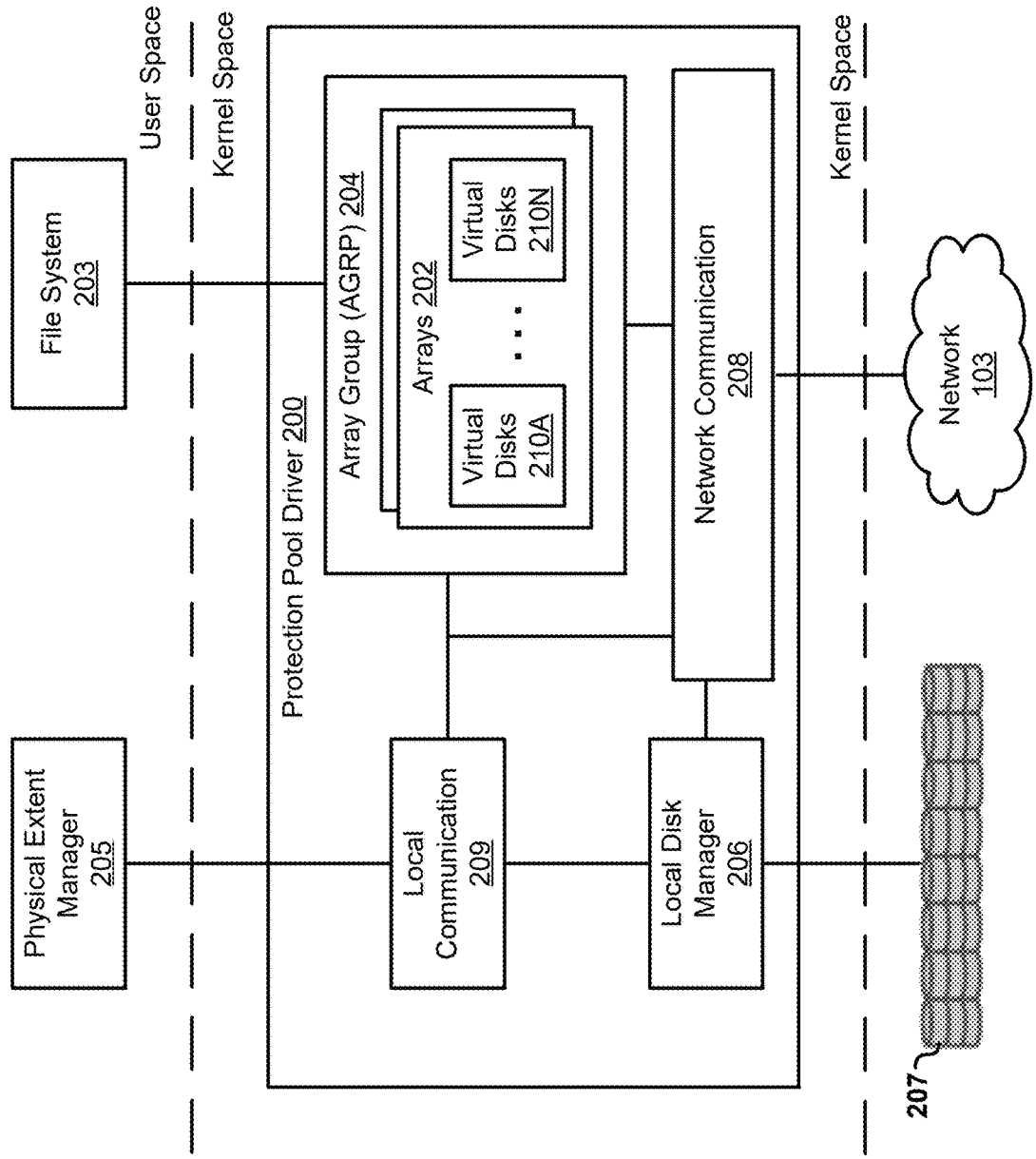
FIG. 2 is a block diagram illustrating an example of a protection pool driver according to one embodiment.

FIG. 2 is an example of a protection pool driver 200 at a storage node 104 according to one embodiment. In one embodiment, protection pool driver 200 is a Linux kernel module that is implemented based on a RAID driver. Different from a traditional RAID driver, protection pool driver 200 manages RAID arrays as part of an AGRP which ties RAID arrays to virtual disks, instead of physical disks. This way, protection pool driver 200 separates the RAID arrays from a direct correlation with physical disks. Although shown as a kernel module, protection pool driver 200 can be implemented as an application used by a user in a user space, or can be implemented as a hardware device.

As shown in FIG. 2, in one embodiment, protection pool driver 200 includes components, such as, array group module (AGRP) 204, local disk manager (LDM) 206, local communication 209, and network communication 208. Protection pool driver 200 can interface with file system 203 and Physical Extent Manager (PEM) 205, where PEM 205 can be an application executed in a user space.

PEM 205 can manage storage allocation/modification requests from file system 203 or user driven event. An instance of PEM 205 can be initiated on each node in a node cluster. PEM 205 on a node can communicate with other components, e.g., AGRP 204/LDM 206, running on the same node or other nodes within a cluster. For example, when additional capacity is required, PEM 205 may request a list of available PEs for array creation from LDMs of one or more nodes in the cluster. PEM can then request allocation of available PEs from the one or more local disk managers (LDMs) on the one or more nodes in the cluster.

AGRP 204 can include one or more arrays (or RAID arrays) 202. RAID arrays can be modified to use virtual disks 210A-210N instead of physical disks, where each virtual disks 210A-210N can include one or more physical extents (PEs) (not shown). A virtual disk 210A can be a module that includes one or more PEs, where a virtual disk 210 of a RAID array represents a stripe unit index of the RAID array. In one embodiment, a predetermined number of PEs (e.g., a column of PEs) can be assigned to a virtual disk 210 (e.g., up to 24 PEs). In one embodiment, a RAID array 202 can be represented by rows (the virtual disks in a RAID array) of columns of PEs (the PEs in a virtual disk), or a two-dimensional (2D) array of PEs, a row of PEs in a 2D array of PEs can function like a child array within the parent RAID array, so long the allocation of each PE in the row of PEs is allocated from a different physical disk. In this case, each row of PEs (child array) performs as a failure domain. E.g., any two PEs in a current row can fail and not affect the other rows. Furthermore, two other PEs can fail on a different row and not affect the current row. This way, the system can tolerate failures up to four physical disks and an array would still be available. In contrast, once a third disk fails in a traditional RAID array with 6+2 configuration, the array is stopped and the system is required to be recovered.

AGRP 204 can manage the creation of arrays 202 and can generate unique identifiers for arrays 202, where arrays 202 can be reassembled or migrated to other nodes within a cluster. AGRP 204 can manage the creation, reconstruction, reassemble, disassemble, and destruction for arrays 202 of AGRP 204. RAID arrays 202 managed by AGRP 204 can thus dynamically grow and shrink by allocated additional storage from physical disks of any nodes within the cluster. In one embodiment, when a node in the cluster fails, AGRP 204 can be migrated from a failing node to another node so access to arrays 202 managed by AGRP 204 can be maintained. In one embodiment, depending on the RAID configuration, RAID array 202 of AGRP 204 can be a protected storage array that is resilient against multiple disk and/or single node failures.

In one embodiment, AGRP 204 can be created on any node in the cluster, migrate to any node in the cluster, but can only be assembled on one node at a time. AGRP 204 can have a unique identifier that PEM 205 can use to access AGRP 204 and its arrays. Thus, AGRP can manage the arrays that represent one or more storage partitions available to node 104.

In one embodiment, each of PEs may be designated with an address. Thus, a virtual disk 202 can include a list of addresses (e.g., PEs), where each address (PE) points to a specific location on one or more physical disks 207 on a same storage node 104 or a different storage node within a node cluster. In one embodiment, the list of addresses can be represented by UUIDs. In one embodiment, PEs can be mapped to a physical disk 207 across the cluster, where the mapping is performed by a local disk manager that is managing physical disk 207.

Local communication component 209 can process I/O requests among components of node 104. For example, local communication component 209 can bridge the communication between PEM 205, file system 203, and any components (e.g., LDM 206, AGRP 204, network communication component 208) of protection pool driver 200.

Network communication component 208 can process I/O requests among different components of node 104 or any other nodes within the cluster. For example, when a node issues I/O requests for a PE, the I/O request can be redirected, by AGRP of the node, to a physical disk/node within the cluster, e.g., a destination where the requested PE can be found. In one embodiment, network communication component 208 may be interconnected to other storage nodes at a kernel driver layer to direct the I/O request from a sending node to a receiving node. For example, a node receiving an I/O request may process the I/O request by retrieving a PE from a storage disk at the receiving node. Once the I/O request is complete, data from the PE may be returned from the receiving node to the sending node, via network communication component 208.

LDM 206 can manage physical disks 207 on node 104. LDM 206 can divide each disk 207 into one or more PEs and manage the allocation and ownership of these PEs. For example, LDM can manage the approval of allocation/deallocation of PEs for arrays. Allocation/deallocation of PEs can be requested by PEM, for array creation, array expansion. For example, a PEM can request PEs for allocation, LDM can approve or reject the PEM request. For another example, if PEMs on two separate nodes request a same PE for allocation at a same time, LDM can approve the request for one PEM but would have to deny the allocation request for another PEMs, since the PE would no longer be available. In one embodiment, when LDM 206 receives concurrent requests, the approval selection process can be based on a first in line. In another embodiment, the approval selection process can be based on a latency, e.g., the requests can include a latency indicator and the PE is allocated to requests with a lower latency indicator.

Figure 3:
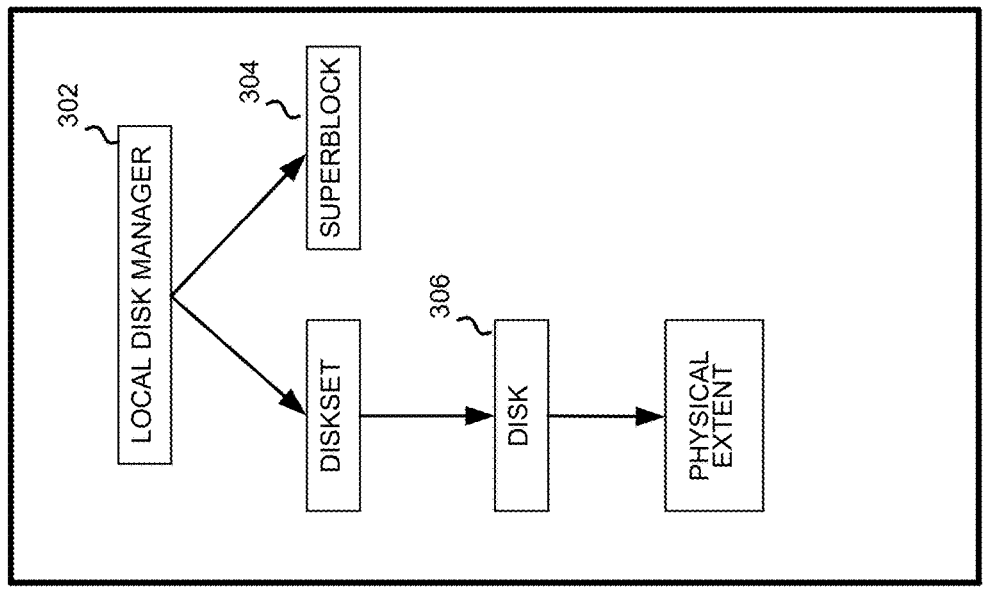
FIG. 3 is an illustration depicting an example of local disk manager according to one embodiment.

FIG. 3 shows an example of Local Disk Manager (LDM) architecture according to one embodiment. LDM 302 can manage the physical disks on a node. LDM 302 can initiate creation of a PE map, manage PE allocations, perform proactive disk error monitoring, disk failure management, maintain a current state of disks and/or PEs, and manage metadata of the PEs in the Protection Pool RAID superblock 304. In one embodiment, zero or more LDMs 302 can be present on a single node. Zero LDMs 302 can indicate that there is no internal storage (e.g., disks 306) available at the node. Having more than one LDM 302 can allow disks 306 to be grouped based on disk characteristics. In one embodiment, a single LDM 302 can manage a predetermined number of disks (e.g., 132 disks). As described previously, LDM 302 can manage allocation and current ownership of a device's PEs. As arrays are created, the creation process will request allocation from all LDMs owning PEs. The LDM can allocate the PEs and store the current owner in LDMs superblock data 304. When the system is booted up, LDM 302 can provide a current state for PEs, managed by LDM 302 to PEMs of one or more nodes, to upper-level processes.

In one embodiment, when disk(s) are added to LDM 302, a performance group can be assigned to the disks. The performance groupings provide PEM indications if the PE should be allocated to arrays of which performance tiers. In one embodiment, LDM 302 can also monitor physical disk errors and notify a PEM when a disk has exceeded an error threshold and/or when maintenance is required. For example, when a write error occurs, an array may fail, and the AGRP of the array may notify the LDM that the PE has failed. LDM subsequently can notify each array that have PEs allocated on the failing disk, broadcast a message to PEMs on all nodes indicating a disk failed. In one embodiment, arrays with failed PEs may run in a degraded state until a replacement PE is allocated by PEM.

Figure 4:
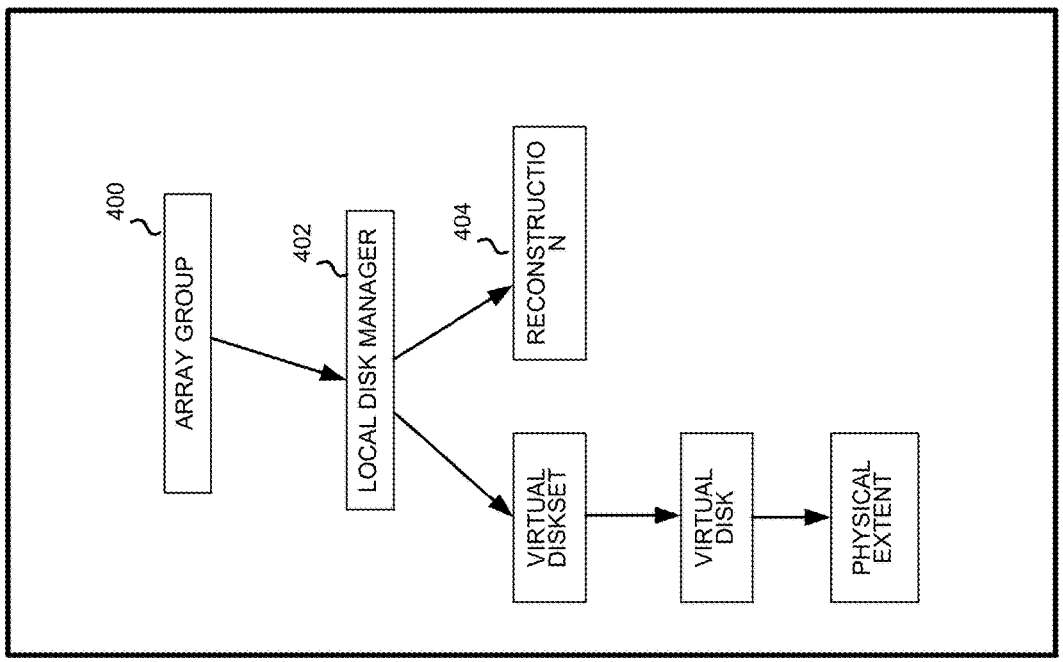
FIG. 4 is an illustration depicting an example of array group according to one embodiment.

FIG. 4 shows an example of an array group (AGRP) 400 having a collection of arrays 402 that belong to the same file system collection partition according to one embodiment. Only one array group can belong to the same collection partition. Array group 400 may be configured to manage the creation, reconstruction, reassemble disassemble and destruction of associated arrays 402. The AGRP 400 can be created on any node in the cluster and can migrate to any node in the cluster but can only be assembled on one node at a time. The AGRP 400 can have a unique ID that upper-level processes can use to identify and manage the AGRP and its Arrays. In one embodiment, each of arrays 402 in AGRP 400 can be associated with an active tier, cache tier and/or cloud tier, and two or more tiers can be associated with PEs that reside in a same storage disk. The different tiers (e.g., active tier, cache tier and/or cloud tier, etc.) allow the arrays to be identified for different usages, such as for active storage where data is frequently accessed, cache storage where data is cached, or cloud storage where data is associated to a cloud server. The tiers can indicate a performance requirement and/or up time requirement associated with the array.

The AGRP (e.g., 204) will periodically monitor each array and check each arrays PE row(s). If an array has a spare PE allocated for a failed PE (full Reconstruction), replacement PE (copy reconstruction) or a PE being migrated to a new location, a reconstruction is started. In one embodiment, all reconstructions are done on a PE granularity. In one embodiment, the order of priority for reconstruction is: all PE rows with 2 failed PE are reconstructed first, then any PE row with one failed PE, and then any row that requires copy reconstruction or migration. For example, multiple reconstruction on different arrays is allowed.

Physical Extent (PE) allocation is managed by the Physical Extent Manager (PEM) (e.g., 205) in communication with LDMs (e.g., 206). In one embodiment, there is a PEM (e.g., 205) running on all nodes and there will not be a master PEM. When PEs are allocated during array creation or expansion, the LDM (e.g., 206) that manages the physical disk will allow allocation of an extent.

Note that some or all of the components as shown and described above (e.g., components 202, 204, 205, 206, add 208 of FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Reconstructions:

Reconstructions may be started for many reasons (user request fail disk, failed write on a PE, rebalancing, exceed error thresholds), the reconstruction process is managed by the PEM (e.g., 205) and done on PE boundaries.

Three types of reconstruction are supported: full, copy, and migration. The reconstruction of PEs from one physical disk could use spare PEs from multiple physical disks, because multiple PE's need to be reconstructed. PEs can also be reconstructed simultaneously. Having multiple concurrent reconstructions reduces the overall reconstruction time.

Full Reconstruction

Full reconstruction is used when a disk is immediately removed from service. This is usually caused by a disk write failure or a service action. A full reconstruction must read from all the remaining PEs in an extent row and regenerate the missing data from the remaining disks.

When a write error occurs, the array receiving the error will notify the LDM (e.g., 206) and start the disk failure process. The LDM (e.g., 206) will notify arrays on all nodes that have PE allocated on the failing disk. The LDM (e.g., 206) will then issue a multicast message to all PEM's. Each PEM (e.g., 205) will then allocate replace PE's and assign them to the degraded arrays. Once the PEs are allocated the AGRP (e.g., 204) will start the reconstructions.

Copy Reconstruction

Copy reconstruction is used when a disk is still functioning, but it has exceeded the error threshold. A copy reconstruction will only involve the PE being replaced (source PE) and the new PE (destination PE). The stripe unit is copied from the source PE, verified, and then written to the destination PE. Both the source and destination PEs are kept in sync until the reconstruction is complete. Once all the source PE's have completed reconstruction the disk is failed.

Migration

Migration is much the same as copy reconstruction. The only difference is the PEs are copied to a new location. Once all the PEs are migrated off the source disk all the PEs are in the available state.

Enhanced Spare Allocation Scheme

Figure 5A:
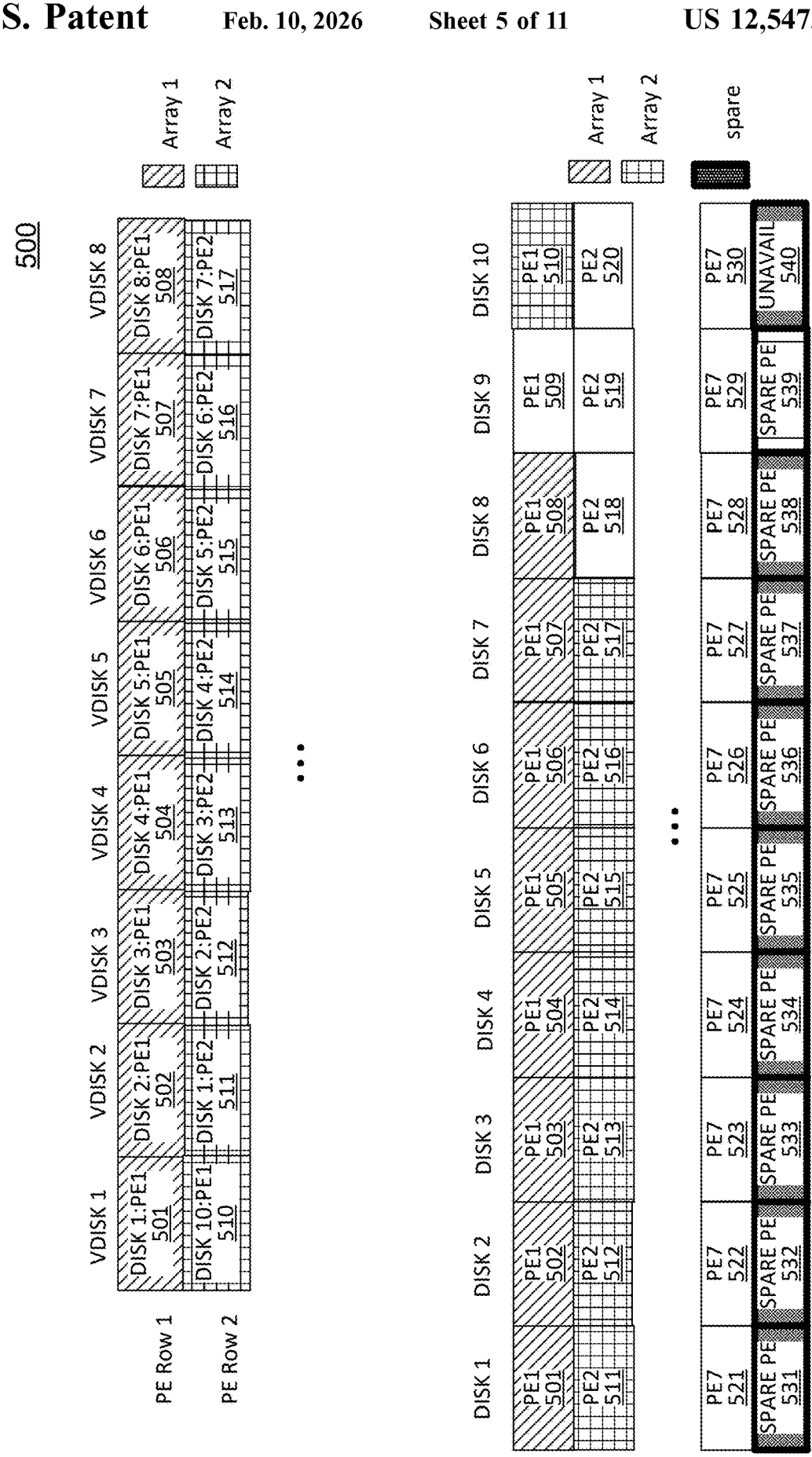
FIG. 5A is an example of a node with physical extents layout according to one embodiment.
Figure 5B:
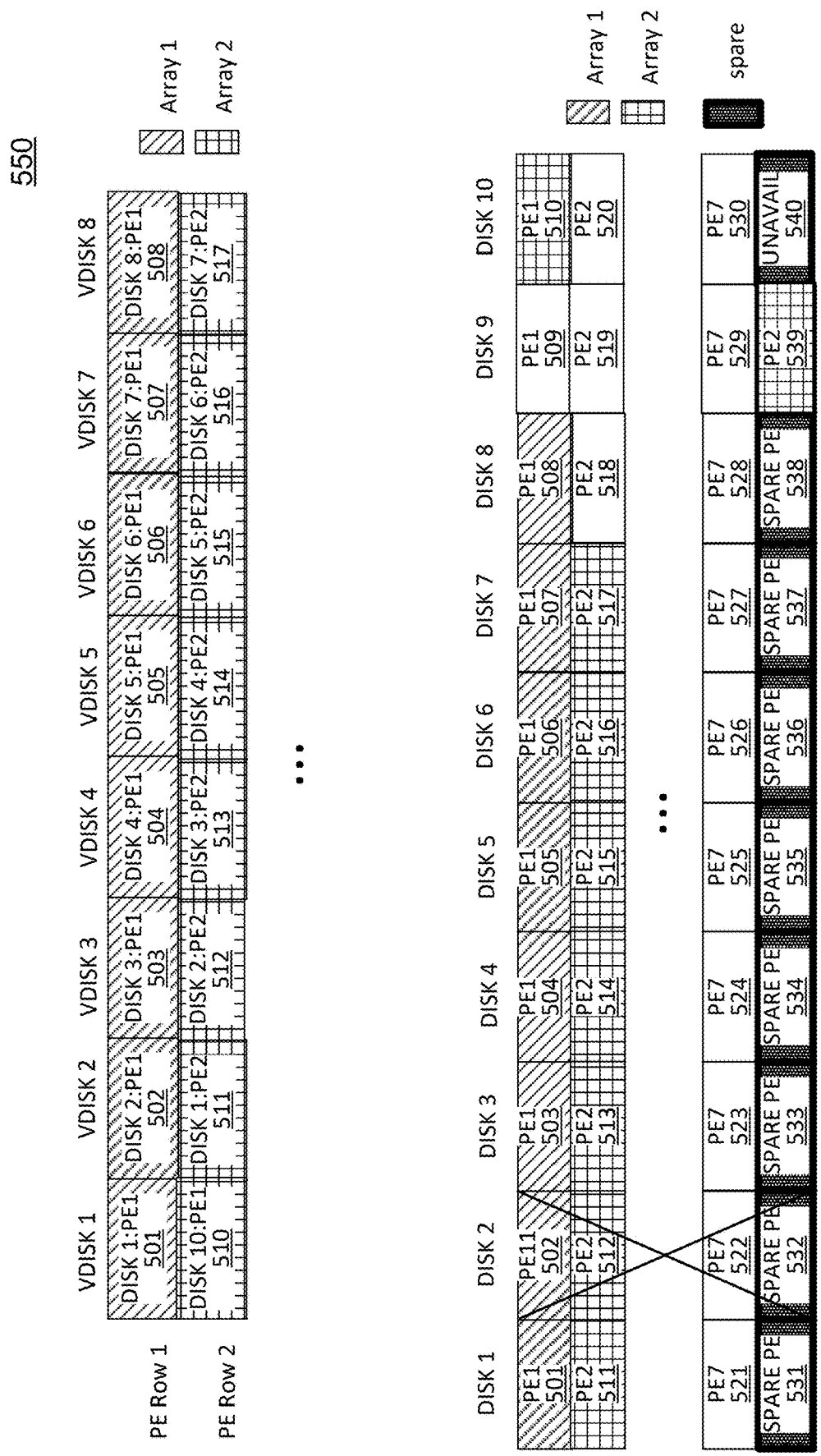
FIG. 5B is an example of a spare allocation scheme that has a large reconstruction wait time because of unavailable spare PEs according to one embodiment.
Figure 5C:
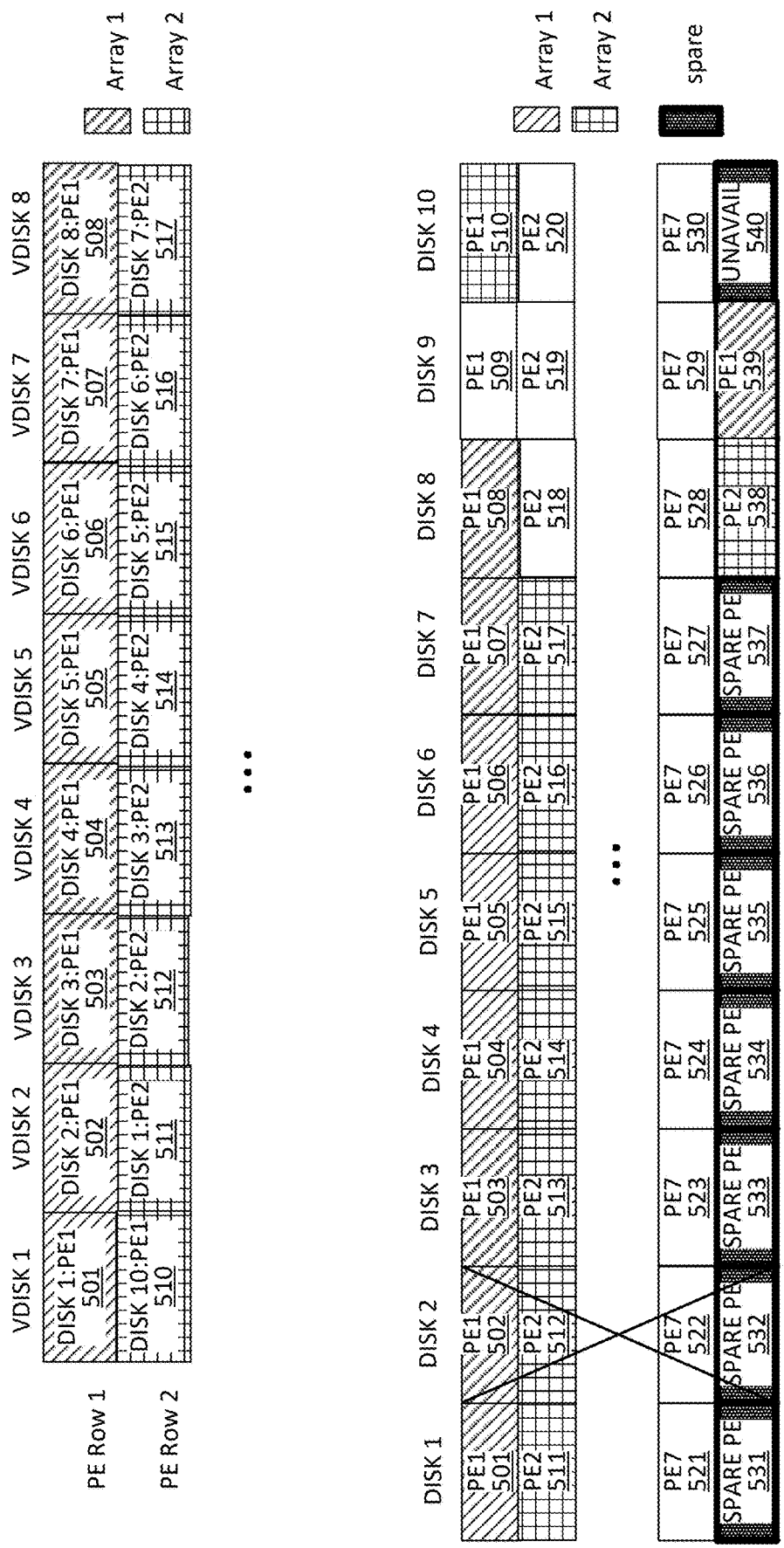
FIG. 5C is an example of a spare allocation scheme that has reassigned PEs to minimize reconstruction wait time according to one embodiment.

In an embodiment, as shown in FIGS. 5A-5C, when the Disk 2 (e.g., tables 550, 560) and extends (e.g., 502, 512, 522, 532) associated with the Disk 2 failed, currently PEM (e.g., 205) allocates Spare PEs (e.g., 531-540; 531-531 are still available; 532 is associated with failed Disk 2 which is not available anymore, 540 is also not available) in round robin order, by following "Array row rule." (e.g., tables 500, 550, 560). In an embodiment, with the enhanced spare allocation scheme, in cases when PEM (e.g., 205) needs to allocate spares PEs (e.g., 531-540) to arrays (e.g., Array 1: from PE1 501 to PE2 508, Array 2: PE1 510 to PE2 517), free spare PEs (e.g., available spare PEs 531, 533-539) are available for reconstruction in spare PE pool (e.g., 531-540), but the free spare PEs (e.g., available Spare PEs 531, 533-538) do not satisfy the "Array row rule" for the current Array 1 (e.g., 501, 503-508 of the Array 1), PEM (e.g., 205) will start a spare PE exchange process. That is, the spare PE exchange process reassigns a spare PE (e.g., free Spare PE1 539 to replace the failed PE2 512 of Array 2 in table 550) that is already assigned to another array (e.g., Array 2) to the current array (e.g., Array 1) and assigns a free spare PE (e.g., 538 to Array 2 in table 560) to the another array (e.g., Array 2 PE2 512 in table 560), where the assigned spare PE (e.g., 539) meets the "Array row rule" for the currently failed array (e.g., 502 of Array 1) and the free spare PE (e.g., 538) meets the "Array row rule" for the another array (e.g., 512 of Array 2). This way, the failed PE (e.g., 502) of the current array (e.g., Array 1) can undergo reconstruction without delay.

FIG. 5A is an example of a node with physical extents layout according to one embodiment. Node 500 can represent node 104 of FIG. 1. Node 500 can be one node in a storage system, such as system 100 of FIG. 1, with multiple nodes.

Referring to FIG. 5A, in this scenario, node 500 can include eight virtual disks (vdisk 1-8) mapped to ten physical disks (disk 1-10), but other quantities of virtual disks mapping to physical disks is possible.

In one embodiment, each disk (e.g., disk 1-10) can represent a solid state disk (SSD) or a spinning hard drive (HDD) or any other types of memory disks. Each of disk (e.g., disk 1-10) can include a number of physical extents (e.g., PE1 501-508) used for the raid storage arrays (e.g., Array 1, etc.). Here, a RAID storage array can be distributed to two or more hard disk drives via different RAID configurations. Physical extent can be a continuation range of memory address in a hard drive, typically 1 GB, or 500 MB, etc. The RAID system (or arrays) can be in different RAID configurations. For example, a 6+2 raid configuration, where the one or more virtual disks of the 6+2 raid configuration comprise six data virtual disks and two parity virtual disks.

It should be noted that, due to physical limitations, an array has to satisfy the "array row rule", where the array row rule indicates that an extent row cannot have two PEs on a same physical disk. For example, if an array (e.g., Array 1 from PE1 501-508) already uses an extend of a disk (e.g., PE1 508 of disk 8), then the same array (e.g., Array 1) cannot use another extend of the same disk (e.g., 538 of the disk 8).

Referring to FIG. 5A, in this scenario, node 500 has virtual disks at two arrays, e.g., Array 1 (PE1 501 to 508) and Array 2 (PE2 512-518, 520). Each of these arrays can represent a RAID array. The array can be mapped to the physical disks. In one embodiment, each of the physical disks (e.g., disks 1-10) has 8 PEs (e.g., PE1, PE2 . . . PE7, PE8), where PE8 is designed as spare PEs (e.g., 531-540). Spare PEs are PEs that are typically not assigned to any arrays. These PEs are used for reconstruction purposes when PEs of arrays in the RAID system are mitigated.

FIG. 5B shows an example of a spare allocation scheme that has a large reconstruction wait time because of unavailable spare PEs according to one embodiment. As described above, in an embodiment, in FIG. 5A, 500 refers to the storage before the reconstruction assignment. For example, in 500, there are Array 1 and Array 2 (e.g., Array 1: from PE1 501-508; Array 2: from PE1 510-PE2 517).

In an embodiment, in FIG. 5B, 550 refers to the storage after the reconstruction assignment without using the enhanced spare allocation scheme. Here, spare PE 539 is assigned to replace the PE2 512 for Array 2 after the physical disk 2 is indicated to be failed. However, no free spare (e.g., 531, 533-538) is available for the failed PE (e.g., PE1 502) of Array 1 under the "Array row rule". Therefore, the system needs to wait, for example, wait until the new replacement disk to replace failed Disk 2 in order to reassign the failed PE (e.g., PE1 501) of Array 1.

In other words, reconstruction of any PEs for array 1 can only be assigned to spares 539 or 540 to comply with the array row rule since these two spare PEs are at disks 8 and disk 9, and both disks 8 and 9 are not being used to store PEs of array 1. Similarly, reconstruction of any PEs for array 2 can only be assigned to spares 538 of disk 8 or 539 of disk 9 to comply with the array row rule. Note that the subsequent flowcharts 600 and 700 illustrate details of two scenarios where a physical disk fails.

In one scenario, the spare PE 539 may be assigned to PE2 512 of array 2 for reconstruction, because the spare PE 539 is available for reconstruction. Note that the assignment of PEs for reconstruction may be served randomly from the pool of spare PEs or the assignment may be round robin, or the assignment may use some predetermined patterns of assignments.

When the spare PE 539 is already utilized by array 2, the spare PE 539 will not be available to array 1. However, since array 1 requires a spare PE to meet the array row rule (e.g., spare PE 539), the reconstruction of PE1 502 for array 1 would not occur until spare 539 becomes available. In one scenario, a user can manually reassign the reconstruction for array 2 to make spare 539 available to Array 1. In another scenario, the data at spare PE 539 for array 2 can be migrated to another free/available spare PE, or the disk failure has been corrected, e.g., mitigated physical disk is swapped out for a new physical disk, or data at spare PE 539 may have been deleted by an end-user. Then the spare PE 539 can become available again. However, the timing of the availability of PE 539 is not predictable/ascertainable and the reconstruction of array 1 waits for the availability of a spare PE that meets the array row rule for array 1 reconstruction. The FIG. 5C below describes a solution to avoid such a delay.

FIG. 5C shows an example of a spare allocation scheme that has reassigned PEs to minimize reconstruction time according to one embodiment.

In an embodiment, in FIG. 5, 560 refers to the storage after the reconstruction assignment by using the enhanced spare allocation scheme. For example, in 560, spare PEs (e.g., 531-540) are PEs for reconstruction in the pool. When a physical disk failed, free spare PEs (e.g., 531, 533-539, since 532 and 540 are not available) are available for reconstruction in the pool. In one scenario, Array 2 (e.g., PE1 510-PE2 517) has a failed PE (e.g., PE2 512) that is getting reconstructed to Spare PE1 (e.g., 539). Array 1 (e.g., PE1 501-508) has a failed PE (e.g., PE1 502) which did not find spare PE to reconstruct to as per the "Array row rule", but spare PEs (e.g., 539) can be used for Array 1's failed PE (e.g., PE1 502) and those spare PEs (e.g., 538, 539) can be used for Array 2's failed PE (e.g., PE2 512). Therefore, PEM (e.g., 205) can free up spare PE1 (e.g., 539), allocate free spare PE2 (e.g., 538) to Array 1 (e.g., PE1 502) and then allocate spare PE1 (e.g., 539) to Array 2 (e.g., PE2 512). Here, the assigned spare PE 539 for Array 2 can be exchanged (e.g., reassigned) to spare PE 538 so that the system can assign spare PE 539 to array 1 for reconstruction without delay, thus, reduce the processing time (i.e., no need to wait for the replacement disk for the failed Disk 2). If a spare PE cannot be found and no extent is available for exchange that meets the array row rule, system will defer the reconstruction for the failing array until a spare PE that meets the array row rule becomes available in the pool for the array reconstruction.

This exchange extent enhancement guarantees the maximum utilization of spare PEs from the pool which reduces the time RAID arrays must run in degraded mode.

Figure 6:
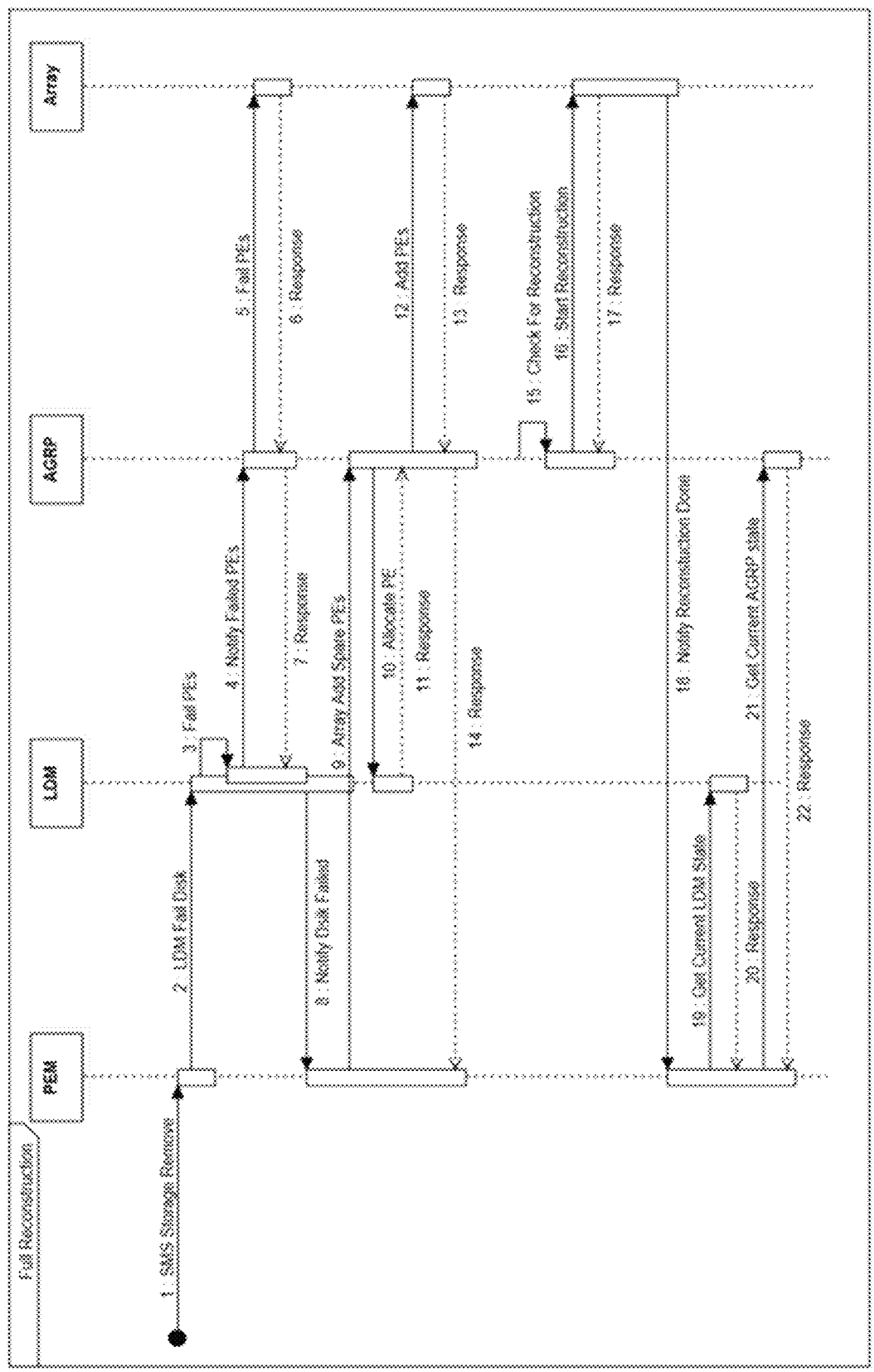
FIG. 6 is a block diagram illustrating an example of a workflow of the enhanced spare allocation scheme based on the user requested disk fail according to one embodiment.

FIG. 6 shows a block diagram illustrating an example of a workflow of the enhanced spare allocation scheme based on the user requested disk fail according to one embodiment. Flowchart 600 below illustrates a process to perform the enhanced spare allocation scheme, according to an embodiment of the application.

Flowchart 600:

| Steps | Description | Parameters |
|---|---|---|
| 1 | User requests SMS to fail a disk using storage remove with the force option. SMS generates requests for PEM to fail the disk. | Disk |
| 2 | PEM issues a request to LDM to fail disk. | DM Disk |
| 3 | LDM prepares a list for each AGRP that has PEs allocated on failed disk. | |
| 4 | LDM notifies each AGRP with a list of PEs for all affected Arrays | List of PEs by array |
| 5 | AGRP instructs each array to fail affected PE's | List of PE's |
| 6 | Array response when PE's have been failed Steps 5 and 6 are repeated for all arrays. | |
| 7 | AGRP responses to LDM when PEs are failed | |
| 8 | LDM issues messages to all PEM's indicating the disk that failed. A list of all the allocated extents and which array it is allocated to. | Failing disk, list of failed extents |
| 9 | PEM allocates replacement PE's and issues add spare PEs to each of the affected array via the AGRP. | List of spare PEs |
| 10 | AGRP sends allocation request to each LDM the new PE is located. | List of PE's |
| 11 | LDM responds and grants allocation. | |
| 12 | AGRP requests array to add PEs to the failed virtual disk and PE row. | List old PE's |
| 13 | Response the PE's added successfully. | |
| 14 | AGRP responds that the array successfully added the list of PEs. | |
| 15 | AGRP does periodic check of all arrays if reconstruction or migration is needed. | |
| 16 | ARGP issues the start of the full reconstruction process to one of more arrays. | |
| 17 | Each array responds the reconstruction started and runs in background. | |
| 18 | Array notifies PEM when reconstruction is complete. | |
| 19 | PEM requests current LDM state. | LDM config struct |
| 20 | LDM returns current configuration data. | |
| 21 | PEM requests current AGRP/Array states. | AGPR config struct |
| 22 | AGPR returns current configuration data. | |

Figure 7:
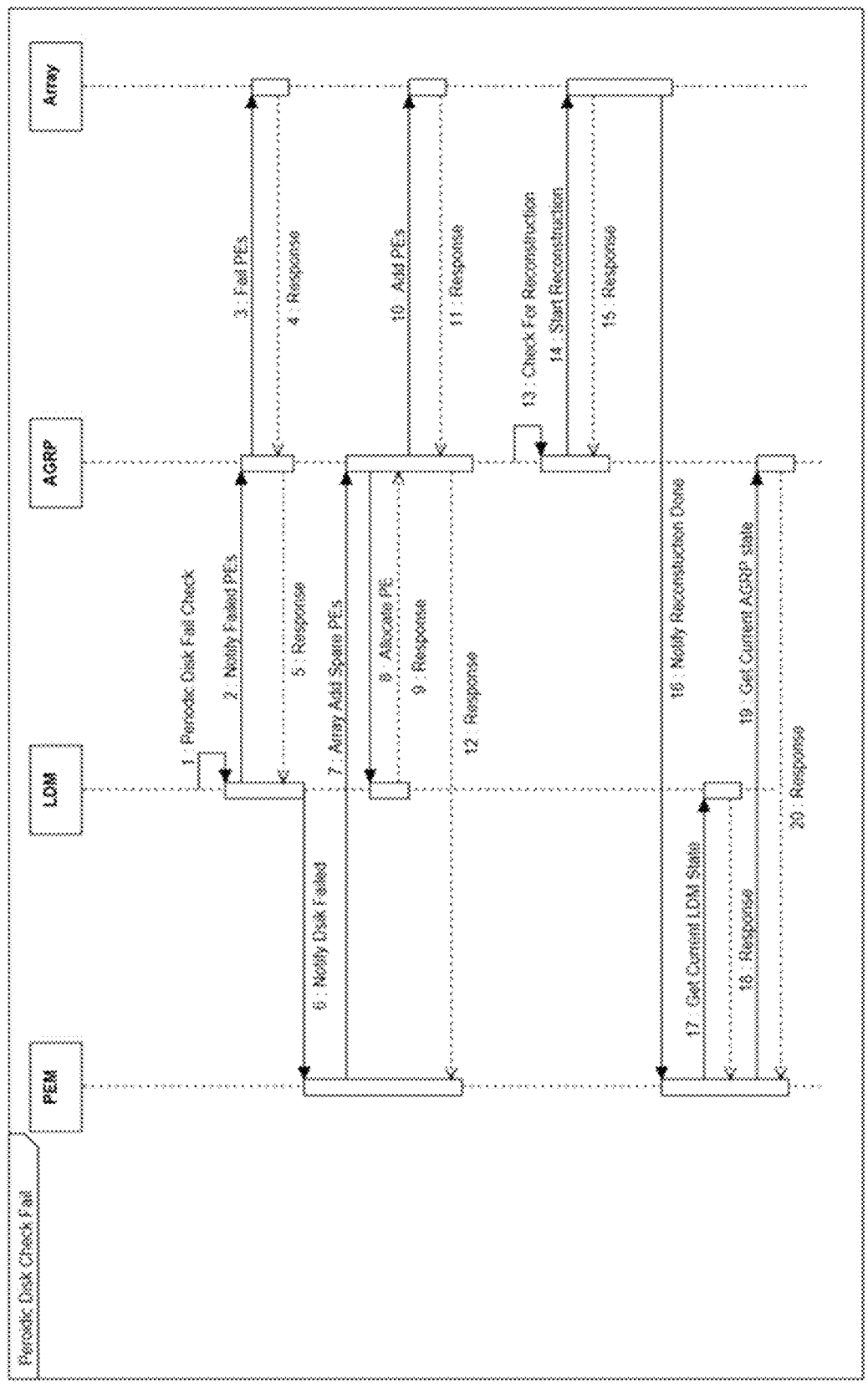
FIG. 7 is a block diagram illustrating an example of a workflow of the enhanced spare allocation scheme based on the periodic disk error threshold disk fail according to one embodiment.

FIG. 7 shows a block diagram illustrating an example of a workflow of the enhanced spare allocation scheme based on the periodic disk error threshold disk fail according to one embodiment. Flowchart 700 below illustrates a process to perform the enhanced spare allocation scheme, according to an embodiment of the application.

Flowchart 700:

| Steps | Description | Parameters |
|---|---|---|
| 1 | LDM does a periodic disk check to proactively fail a disk. Once a disk exceeds an error threshold for a predetermined period of time, the disk is marked as a failing disk. LDM prepares a list for each AGRP that having PEs allocated on failed disk. | |
| 2 | LDM notifies each AGRP with a list of PEs for all affected Array. | List of PEs by array |
| 3 | AGRP instructs each array to fail affected PE's. | List of PE's |
| 4 | Array response when PE's have been failed. Steps 5 and 6 are repeated for all arrays. | |
| 5 | AGRP responses to LDM when PEs are failed | |
| 6 | LDM issues messages to all PEM's indicating the disk that failed, a list of all the allocated extents, and which array it is allocated to. | Failing disk, list of failed extents |
| 7 | PEM allocates replacement PE's and issues add spare PEs to each of the affected array via the AGRP. | List of spare PEs |
| 8 | AGRP sends the allocation request to each LDM the new PE is located. | List of PE's |
| 9 | LDM responds and grant allocation. | |
| 10 | AGRP requests array to add PEs to the failed virtual disk and PE row. | List of PEs |

-continued

| Steps | Description | Parameters |
|---|---|---|
| 11 | Response the PE's added successfully. | |
| 12 | AGRP responds that the array successfully added the list of PEs. | |
| 13 | AGRP does periodic check of all arrays if reconstruction or migration is needed. | |
| 14 | AGRP issues the start of full reconstruction to one of more arrays. | |
| 15 | Each array responds to the reconstruction started and runs in background. | |
| 16 | Array notifies PEM when reconstruction is complete. | |
| 17 | PEM requests current LDM state. | LDM config struct |
| 18 | LDM returns current configuration data. | |
| 19 | PEM requests current AGRP/Array states. | AGPR config struct |
| 20 | AGPR returns current configuration data | |

Figure 8:
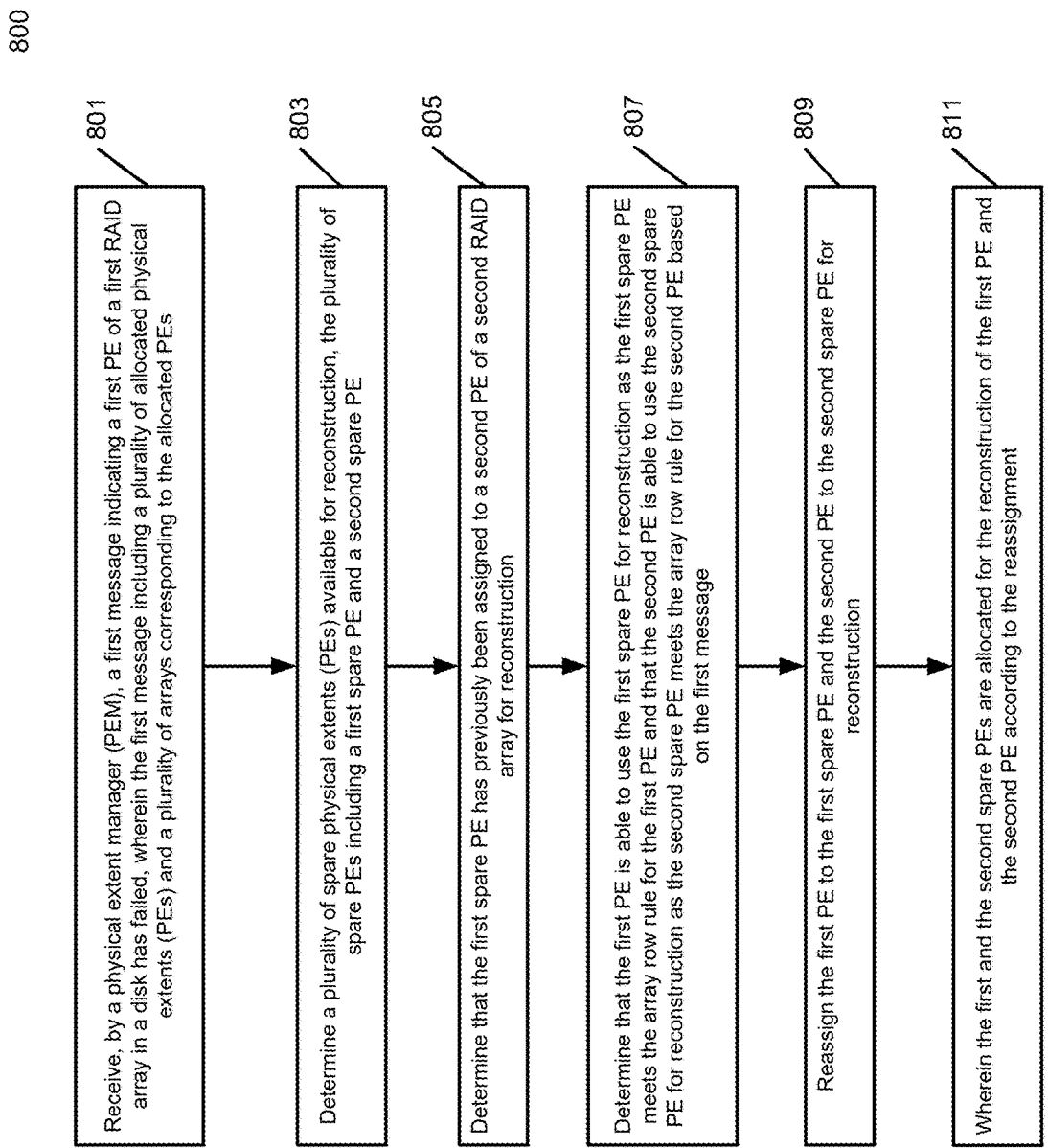
FIG. 8 is a flowchart illustrating a process for the physical extent manager (PEM) to perform the enhanced spare allocation scheme, according to an embodiment of the application.

FIG. 8 shows a flowchart 800 illustrating a process for the PEM (e.g., 205) to perform the enhanced spare allocation scheme, according to an embodiment of the application. In an embodiment, at operation 801, the PEM (e.g., 205) receives a first message indicating a first PE of a first redundant array of independent disks (RAID) array of a disk has failed, wherein the first message includes a plurality of allocated physical extents (PEs) and a plurality of RAID arrays corresponding to the allocated PEs.

At operation 803, the PEM (e.g., 205) determines a plurality of spare physical extents (PEs) available for reconstruction. The plurality of spare PEs includes a first spare PE and a second spare PE.

At operation 805, the PEM (e.g., 205) determines that the first spare PE (spare PE 539) has previously been assigned to a second PE (e.g., PE 512) of a second RAID array (e.g., Array 2) for reconstruction.

At operation 807, the PEM (e.g., 205) determines that a first PE (e.g., PE 502) of a first Array (e.g., Array 1) is able to use the first spare PE (e.g., PE 539) for reconstruction as the first spare PE meets the array row rule for the first PE and that the second PE (e.g., PE 512) is able to use the second spare PE (e.g., PE 538) for reconstruction as the second spare PE meets the array row rule for the second PE based on the first message. Here, the array row rule includes that an extent row cannot have two PEs on a same physical disk.

At operation 809, the PEM (e.g., 205) reassigns the first PE (e.g., PE 502) to the first spare PE (e.g., PE 539) and the second PE (e.g., PE 512) to the second spare PE (e.g., PE 538) for reconstruction.

At operation 811, the first and the second spare PEs are allocated for the reconstruction of the first PE and the second PE.

Figure 9:
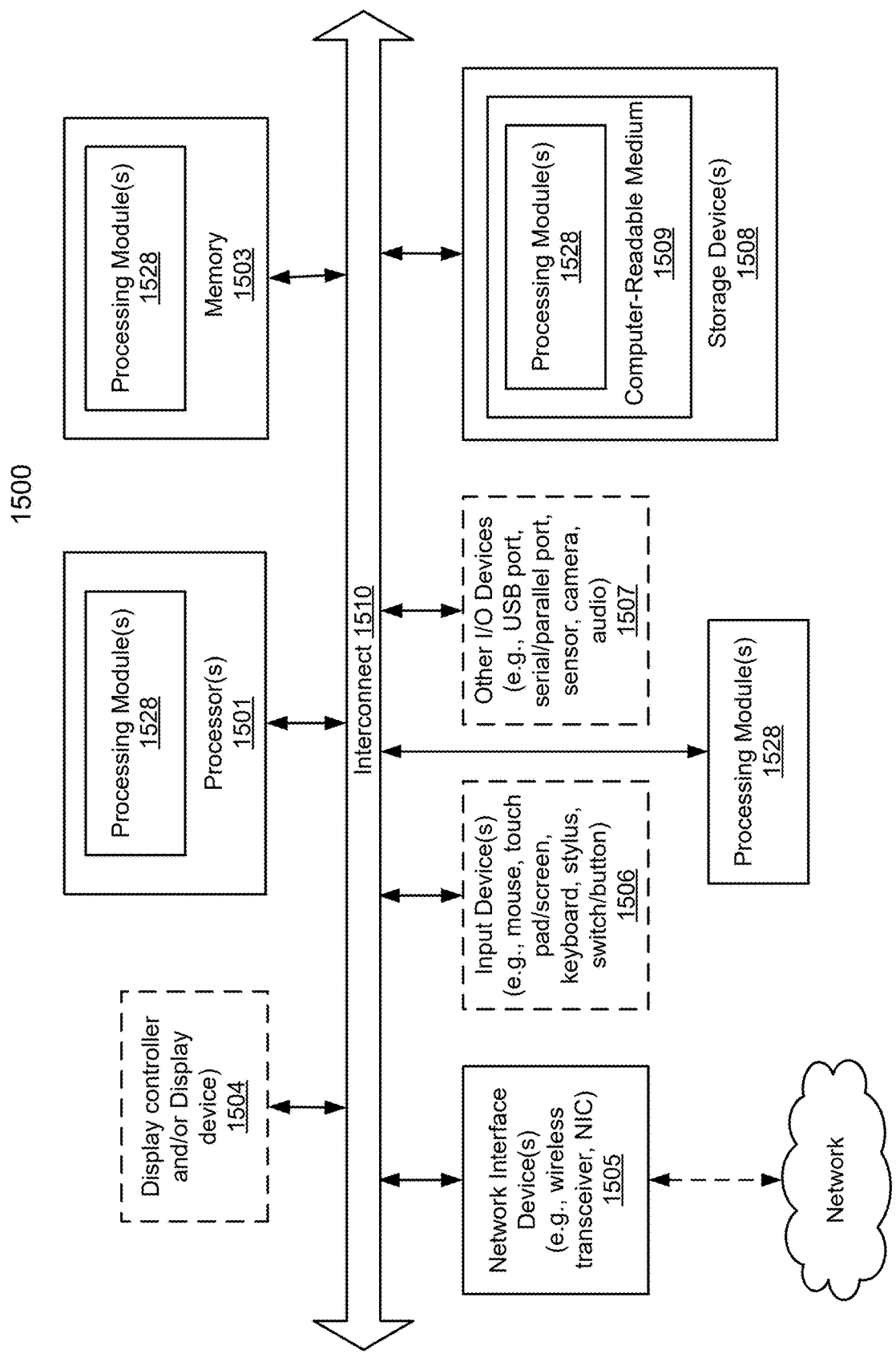
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, any of components 200-209 of FIGS. 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
receiving, by a physical extent manager (PEM), a first message indicating a first PE of a first redundant array of independent disks (RAID) array of a disk has failed, wherein the first message including a plurality of allocated physical extents (PEs) and a plurality of RAID arrays corresponding to the allocated PEs;
determining a plurality of spare physical extents (PEs) available for reconstruction, the plurality of spare PEs including a first spare PE and a second spare PE;
determining that the first spare PE has previously been assigned to a second PE of a second RAID array for reconstruction;
determining that the first PE is able to use the first spare PE for reconstruction as the first spare PE meets an array row rule for the first PE and that the second PE is able to use the second spare PE for reconstruction as the second spare PE meets the array row rule for the second PE based on the first message, wherein the array row rule includes that an extent row cannot have two PEs on a same physical disk; and
reassigning the first PE to the first spare PE and the second PE to the second spare PE for reconstruction, wherein the first and the second spare PEs are allocated for the reconstruction of the first PE and the second PE according to the reassignment.

2. The method of claim 1, wherein before the PEM receives the first message, a local disk manager (LDM) performs a periodic disk check to proactively fail the disk, wherein when the disk exceeds an error threshold for a predetermined period of time, the disk is marked as a failing disk.

3. The method of claim 2, wherein the LDM is configured to manage one or more local PEs at one or more storage disks.

4. The method of claim 2, wherein the allocating the spare PEs for the reconstruction of the first PE and the second PE comprises allocating one or more spare PEs including the first PE and the second PE to each of affected array via an array group (AGRP).

5. The method of claim 4, wherein the AGRP comprises a plurality of storage arrays representing a plurality of raid arrays each having a raid configuration, wherein each of the plurality of storage arrays comprises one or more virtual disks, wherein each of the one or more virtual disks is associated to at least one PE, wherein the at least one PE includes one of: a local PE or an external PE, wherein the external PE is external to a storage node.

6. The method of claim 4, wherein when the disk fails, the LDM prepares a list of PEs for the AGRP, the list indicating the PEs that are allocated on the failed disk.

7. The method of claim 6, wherein the LDM notifies AGRP with a list of PEs for all affected arrays.

8. The method of claim 7, wherein the AGRP instructs each array to fail the affected PEs.

9. The method of claim 8, wherein the LDM sends the first message to the PEM indicating the disk that failed and the list of all the allocated PEs and which arrays allocated to.

10. The method of claim 1, wherein at least one of the first spare PE and the second spare PE is available in a spare PE pool.

11. A physical extent manager (PEM) device, comprising:
a processor; and
a memory coupled to the processor to store instructions, which when executed by the processor, cause the processor to perform operations, the operations comprising:
receiving, by a physical extent manager (PEM), a first message indicating a first PE of a first redundant array of independent disks (RAID) array of a disk has failed, wherein the first message including a plurality of allocated physical extents (PEs) and a plurality of RAID arrays corresponding to the allocated PEs;
determining a plurality of spare physical extents (PEs) available for reconstruction, the plurality of spare PEs including a first spare PE and a second spare PE;

determining that the first spare PE has previously been assigned to a second PE of a second RAID array for reconstruction;

determining that the first PE is able to use the first spare PE for reconstruction as the first spare PE meets an array row rule for the first PE and that the second PE is able to use the second spare PE for reconstruction as the second spare PE meets the array row rule for the second PE based on the first message, wherein the array row rule includes that an extent row cannot have two PEs on a same physical disk; and reassigning the first PE to the first spare PE and the second PE to the second spare PE for reconstruction, wherein the first and the second spare PEs are allocated for the reconstruction of the first PE and the second PE according to the reassignment.

12. The PEM device of claim 11, wherein before the PEM receives the first message, a local disk manager (LDM) performs a periodic disk check to proactively fail the disk, wherein when the disk exceeds an error threshold for a predetermined period of time, the disk is marked as a failing disk.

13. The PEM device of claim 12, wherein the LDM is configured to manage one or more local PEs at the one or more storage disks.

14. The PEM device of claim 12, wherein the allocating the spare PEs for the reconstruction of the first PE and the second PE comprises allocating one or more spare PEs including the first PE and the second PE to each of affected array via an array group (AGRP).

15. The PEM device of claim 14, wherein the AGRP comprises a plurality of storage arrays representing a plurality of raid arrays each having a raid configuration, wherein each of the plurality of storage arrays comprises one or more virtual disks, wherein each of the one or more virtual disks is associated to at least one PE, wherein the at least one PE includes one of: a local PE or an external PE, wherein the external PE is external to a storage node.

16. The PEM device of claim 14, wherein when the disk fails, the LDM prepares a list of PEs for the AGRP, the list indicating the PEs that are allocated on the failed disk.

17. The PEM device of claim 16, wherein the LDM notifies AGRP with a list of PEs for all affected arrays.

18. The PEM device of claim 17, wherein the AGRP instructs each array to fail the affected PEs.

19. The PEM device of claim 18, wherein the LDM sends the first message to the PEM indicating the disk that failed and the list of all the allocated PEs and which arrays allocated to.

20. The PEM device of claim 11, wherein at least one of the first PE and the second PE is available in a spare PE pool.

* * * * *